United States Patent [19]

Riley

[11] Patent Number: 4,581,782
[45] Date of Patent: Apr. 15, 1986

[54] HAMMER

[76] Inventor: Randolph Riley, P.O. Box 61, Malden, Mass. 02148

[21] Appl. No.: 577,547

[22] Filed: Feb. 6, 1984

[51] Int. Cl.⁴ ............................................... B25F 1/00
[52] U.S. Cl. ........................................... 7/146; 7/164; 33/334; D8/81
[58] Field of Search .................. 7/143, 146, 147, 164, 7/170; 33/333, 334, 375; D8/81, 105, 107

[56] References Cited

U.S. PATENT DOCUMENTS

| | | | |
|---|---|---|---|
| 935,459 | 9/1909 | Carr | 7/147 |
| 1,551,779 | 9/1925 | Anderson | 7/146 |
| 1,702,689 | 2/1929 | Duemler | 33/334 |
| 3,119,424 | 1/1964 | Henry | 7/164 |
| 4,332,046 | 6/1982 | Foley et al. | 7/164 |

Primary Examiner—Roscoe V. Parker
Attorney, Agent, or Firm—Wolf, Greenfield & Sacks

[57] ABSTRACT

A common hammer having a common hammer head. The handle, however, is different from a common one in that the bottom edge forms a square with the lower edge. Both a verticle and horizontal level have been embodied in the handle.

3 Claims, 1 Drawing Figure

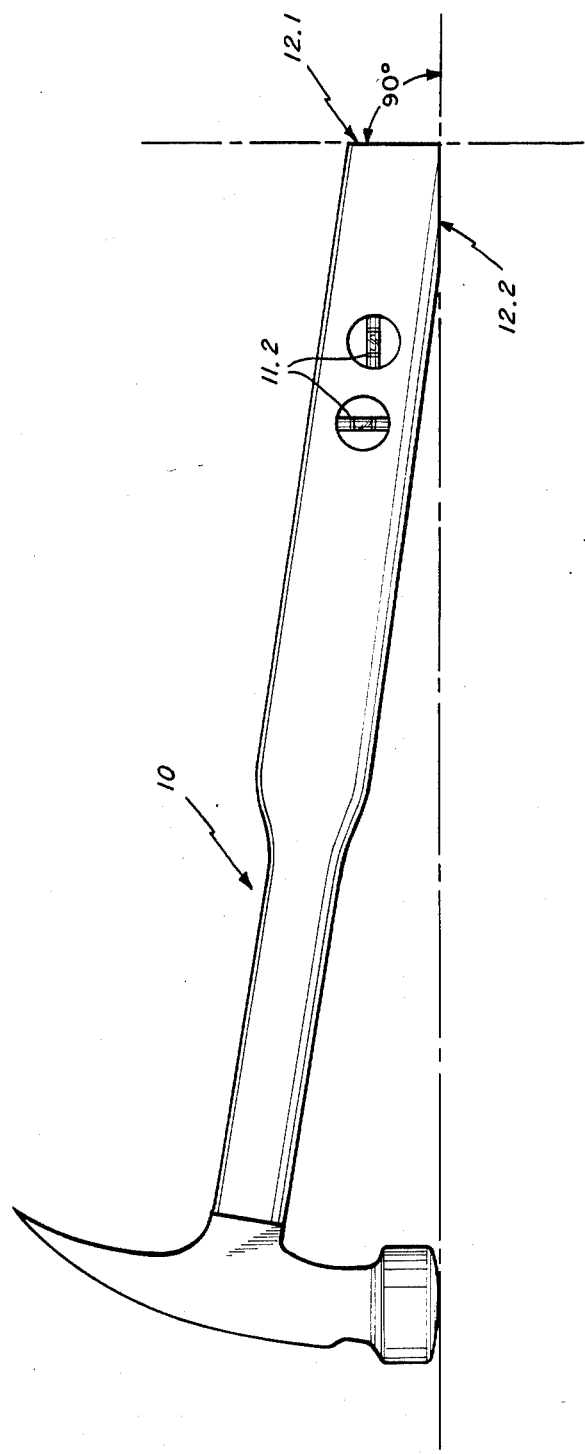

HAMMER

BACKGROUND OF THE INVENTION

As is well known to any individual who has ever framed a house, or performed other related carpentry work, the common hammer is used to drive a nail into a board, and to remove a nail from a board.

While my device has the utility of a common hammer, it will become readily apparent to those skiled in the art that my novel hammer has particular and peculiar advantages in other areas as well.

Since only one hand is required to operate my novel hammer, an individual may level horizontally each board to be nailed in place just prior to driving the nail. A second vertical level will simultaneously square each joint to be nailed.

SUMMARY OF THE INVENTION

In may device a 90° angle configuration in the handle end matches the head end on a longitudinal axis. A level is installed on the same axis. A level is also installed on the vertical axis, parallel to the squared bottom of the handle.

OBJECTS OF THE INVENTION

It is, therefore, one object of the present invention to provide a hammer with multiple and simultaneous uses.

The features of my invention which I believe to be novel are set forth with particularity in the appended claims.

It is therefor one object of the present invention to incorporate an easily accessible, quick-check level within the tool of the common hammer.

Another object of the present invention is to provide a square within the same tool.

My invention may best be understood by reference to the following description, taken in conjunctin with the accompanying drawings.

BRIEF DESCRIPTION OF THE DRAWING

A plain view of my novel hammer showing the square cut handle and the verticle and horizontal levels.

DESCRIPTION OF THE PREFERRED EMBODIMENT

Referring now to the drawing, there will be seen a hammer device 10, having a vertical level imbedded in the handle end 11.2. A horizontal level is imbedded in the hammer end 11.2.

There is a verticle and flat cut on the extreme end of the handle 12.1, and a horizontal and flat cut on the extreme bottom of the handle 12.2. These two cuts form a 90° angle with each other, and provide flat edges that are parallel to each of the two levels.

While I have described what is presently considered the preferred embodiment of my invention, it will be obvious to those skilled in the art that various other changes and modifications may be made thereto without departing from the inventive concept contained therein, and it is, therefore, aimed in the appended claims to cover all such changes and modifications as fall within the true spirit and scope of my invention.

What I claim is:

1. A hammer having a head and an elongated handle, means securing said head to said handle at one end thereof, the other end of said handle having two flat surfaces lying on planes that are orthogonal to one another, said head having a portion of its impact surface also lying in one of said planes whereby said hammer may be rested on the handle surface and head surface which are in said one plane, and a spirit level secured to said handle with said spirit level parallel to said one plane.

2. A hammer as set forth in claim 1 having a second spirit level orthogonal to the first.

3. A hammer as set forth in claim 2 wherein the length of said handle lies in a direction generally lengthwise of said one plane.

* * * * *